(12) United States Patent
Frenkil, Sr.

(10) Patent No.: US 9,003,959 B2
(45) Date of Patent: Apr. 14, 2015

(54) APPARATUS FOR FACILITATING PREPARATION OF EGGS

(71) Applicant: Leonard I. Frenkil, Sr., Glen Burnie, MD (US)

(72) Inventor: Leonard I. Frenkil, Sr., Glen Burnie, MD (US)

(*) Notice: Subject to any disclaimer, the term of this patent is extended or adjusted under 35 U.S.C. 154(b) by 0 days.

(21) Appl. No.: 13/795,251

(22) Filed: Mar. 12, 2013

(65) Prior Publication Data

US 2014/0272037 A1     Sep. 18, 2014

(51) Int. Cl.
*A47J 29/06* (2006.01)
*A47J 36/36* (2006.01)
*A47J 29/02* (2006.01)

(52) U.S. Cl.
CPC ........ *A47J 29/06* (2013.01); *A47J 36/36* (2013.01); *A47J 29/02* (2013.01)

(58) Field of Classification Search
USPC .......... 99/345, 382, 400, 413, 426, 440
See application file for complete search history.

(56) References Cited

U.S. PATENT DOCUMENTS

| | | | | |
|---|---|---|---|---|
| 3,596,590 A | * | 8/1971 | Harris | 99/372 |
| 3,704,663 A | * | 12/1972 | Shull et al. | 99/347 |
| 3,831,508 A | * | 8/1974 | Wallard | 99/440 |
| 4,133,996 A | | 1/1979 | Fread | |
| 4,280,032 A | | 7/1981 | Levinson | |
| 4,681,027 A | * | 7/1987 | Meamber | 99/422 |
| 4,889,741 A | * | 12/1989 | Timmons et al. | 426/614 |
| 4,908,487 A | | 3/1990 | Sarnoff et al. | |
| 5,293,021 A | | 3/1994 | Davis | |
| 5,355,777 A | | 10/1994 | Chen et al. | |
| 6,054,698 A | | 4/2000 | Mast | |
| 6,463,844 B1 | * | 10/2002 | Wang et al. | 99/426 |
| 8,096,437 B1 | | 1/2012 | Ryan | |
| 8,475,858 B2 | * | 7/2013 | Hairsine et al. | 426/298 |
| 2006/0029716 A1 | * | 2/2006 | Harker | 426/614 |
| 2007/0205210 A1 | | 9/2007 | Powell | |
| 2007/0224333 A1 | * | 9/2007 | Ewald et al. | 426/614 |
| 2008/0063777 A1 | * | 3/2008 | Roberts et al. | 426/558 |

FOREIGN PATENT DOCUMENTS

| | | | |
|---|---|---|---|
| CN | 2805634 | | 8/2006 |
| CN | 202269915 | * | 6/2012 |
| DE | 102006058099 | * | 6/2008 |

(Continued)

OTHER PUBLICATIONS

English Translation of CN202269915 published Jun. 2012 taken from http://www.chinatrademarkoffice.com/index.php/ptsearch.*

(Continued)

*Primary Examiner* — Anthony Weier
(74) *Attorney, Agent, or Firm* — Fish & Richardson P.C.

(57) ABSTRACT

An apparatus for cooking eggs that differentiates the exposure of cooking heat to the yolk and albumin of the uncooked egg by controlling both the geometry of the yolk and the albumin and their relative exposures to cooking heat, which includes a body for holding an egg white component of a egg, the body having a bottom surface and one or more side surfaces extending from the bottom surface, and at least one concave recess within the body, the recess facilitating retention and support of an egg yolk component of the shelled egg and holding the egg yolk in a substantially spherical shape, wherein the body and the recess are arranged such that the egg yolk component is shielded at least partially by one or more additional elements in comparison to the egg white component when the egg is in place within the body.

6 Claims, 3 Drawing Sheets

(56) References Cited

FOREIGN PATENT DOCUMENTS

| EP | 0714623 | | 4/1998 |
| EP | 0872431 | | 10/1998 |
| EP | 1419721 | | 3/2006 |
| GB | 2474495 | | 4/2011 |
| JP | 9248249 | | 9/1997 |
| JP | 2011041484 | * | 3/2011 |
| KR | 20080094164 | | 10/2008 |
| WO | 8703462 | | 6/1987 |
| WO | 9302603 | | 2/1993 |

OTHER PUBLICATIONS

International Search Report and Written Opinion in International Application No. PCT/US2014/23548, mailed Jun. 17, 2014, 4 pages.

* cited by examiner

APPARATUS FOR FACILITATING PREPARATION OF EGGS

TECHNICAL FIELD

This disclosure relates to cooking eggs.

BACKGROUND

One of the most popular ways in which an egg is served is to have the egg white, or albumin, cooked to relative firmness while keeping the yellow or egg yolk relatively soft or "runny." Eggs cooked in such a manner are often referred to as "sunny side up," or "over easy." Eggs can also be "poached," in which case the egg white or albumin will be somewhat cooked and the yolk will be relatively soft compared to the albumin yielding somewhat similar results to a "soft boiled egg."

When an egg is cooked with the yolk intact either on a grill or in a frying pan, the egg white spreads and as it becomes relatively thin it begins to cook rather quickly. The egg yolk also flattens somewhat and its cooking is also relatively accelerated, but not as much as the egg white (so long as the yolk remains intact). The yolk begins to cook from exposure to the heat but because it is thicker relative to the egg white, it does not cook as quickly as the egg white. If the egg is removed from the cooking heat in a timely manner, the white will be firm and the yolk will be soft and/or runny. An important aspect is that if the egg yolk does not flatten as a result of its own weight, it will cook considerable slower which in turn allows a larger margin of timing as to when the cook would have to remove the cooking egg from the heat and still achieve a firm egg white and a soft yolk.

Regarding poaching of an egg, it has been recognized that one method of poaching is to simply drop the raw egg into a pot of boiling water, which is a method sometimes used by experienced cooks. Most often, poaching of eggs is carried out by using an "egg poacher." This device consists of a larger pan and a platform within the larger pan that supports smaller pans that each holds an individual egg. The smaller pans are sized in diameter so that when the raw egg is placed in it, the yolk is essentially immersed in the albumin, which tends to yield the desired effect of shielding the yolk from receiving the heat first and thereby causing the yolk to cook slower relative to the albumin. Water is placed in the bottom of the larger pan and the individual egg pans are set in place within the larger pan. A lid is placed over the large pan and when the water begins to boil, hot steam and water vapor envelops the egg in the individual pans and cooks the egg. Again timing is critical to these poaching methods in that the egg cooks from outside inward as the heat travels inward toward the center of the egg. If the egg or eggs are removed from the heat in a timely manner, the yolk, preferably positioned in the middle of the egg mass, in the middle of the small pans will receive the heat last and will, to some extent, be less cooked than the albumin that surrounds the yolk in the small pans.

These methods of cooking an egg require a keen sense of timing and are less than an exact science. A main contributor to this is that although the desired level of cooking for the yolk versus the albumin is different, the exposure to the cooking heat is not significantly differentiated between the two components under present methods. Specifically, no effort is made to differentiate the exposure of the albumin and the yolk to the cooking heat. At best, prior cooking methods surrounded the yolk with the albumin with a goal that the surrounding albumin would cook before too much heat reaches the yolk. Accordingly, it can be very difficult to control the differentiated firmness or the "level of doneness" for each component of the egg relative to each other. For example, when the albumin is cooked to one's preferred firmness, the yolk may end up being overcooked. Conversely, by focusing on the egg yolk while cooking, the albumin can often be undercooked and end up being runny.

FIG. 1 illustrates a cooking device, which is designed for poaching eggs in boiling water. The device holds a raw egg and transmits heat from the boiling water into which it is submerged. Devices such as this do not take into consideration relative amounts of heat transferred to the albumin and egg yolk and can lead to inconsistent results where the yolk is often overcooked or the albumin is undercooked.

SUMMARY

The disclosed implementations provide a convenient and unique means for consistently altering the respective exposures of the albumin and yolk to the cooking heat in order to facilitate a desired different final cooked condition of each of the egg elements. The disclosed implementations accomplish this by controlling the diameter of the pan such that the liquid albumin is caused to lie in a relatively thin even layer and by reducing the exposure of the egg yolk to the cooking heat and accelerating the exposure of the egg albumin to the cooking heat. In certain implementations, this is accomplished primarily by altering the geometry and/or the relative location or relationship to the cooking heat of the two different egg components.

For example, a recess is provided within the cooking apparatus that retains the egg yolk at a certain position relative to the surrounding albumin, allowing cooking energy to first pass through the albumin before reaching the egg yolk. The recess is shaped such that it holds the egg yolk in a manner that assists in sustaining the substantially spherical geometry of the egg yolk, which makes the distance to the core of the egg yolk longer and thus requires longer time and/or more cooking energy to fully cook the yolk than where the egg yolk would be somewhat flattened as a result of lying on a flat surface of the pan. In another example, the recess provides an insulating shield to the egg yolk, reducing the amount of cooking energy that reaches the egg yolk relative to the surrounding albumin.

The disclosed implementations are designed to control the configuration of the two egg elements as well as their respective relationships to the cooking heat, which automatically causes the different elements to be exposed to the cooking heat differently. Accordingly, the user of the devices and methodologies disclosed herein are afforded the ability to observe the "doneness" of virtually all of the egg while in the shallow pan, and a greater margin of timing as to when the egg should be removed from the cooking heat which is the result of the marked acceleration of the cooking speed of the egg white versus the retardation of the speed with which the yolk is cooked.

In one general aspect, an apparatus for cooking eggs includes a body for holding an egg white component of a shelled raw egg, the body having a bottom surface and one or more side surfaces extending from the bottom surface, and at least one concave recess within the body, the recess facilitating retention and support of an egg yolk component of the egg and holding the egg yolk in a substantially spherical shape, wherein the body and the recess are arranged such that the egg yolk component is shielded at least partially by one or more additional elements in comparison to the egg white component when the egg is in place within the body.

Implementations may include one or more of the following features. For example, one of the one or more additional elements is the egg white component. The body is formed with a first microwave-transmissible material. The body is formed with a first heat-conducting material. One of the one or more additional elements is a layer of a second microwave-transmissible material covering the recess, the second microwave-transmissible material transmitting microwave less efficiently than the first microwave transmissible material. The one or more additional elements comprises a semi-permeable radiation shield as part of the recess, the shield being made with a second microwave-transmissible material transmitting microwave less efficiently than the first microwave transmissible material. One of the one or more additional elements is a layer of a second heat-conducting material forming a part of the recess, the second heat-conducting material conducting heat less efficiently than the first heat-conducting material. The one or more additional elements comprises a semi-permeable heat shield as a part of the recess, the shield being made with a second heat-conducting material conducting heat less efficiently than the first heat-conducting material. The concave surface of the recess is formed as a depression in the bottom surface of the body. The concave surface of the body is elevated relative to the bottom surface of the body. The body is configured such that the egg yolk component retained in the recess is substantially submerged in the egg white component. The body is configured such that the egg yolk component retained in the recess is partially exposed from the egg white component.

In another general aspect, an apparatus for cooking eggs includes a body having a relatively flat bottom surface and one or more surfaces extending from the bottom surface, a curved element disposed on the bottom surface of the body and configured to retain an egg yolk component of a shelled egg relative to an egg white component of the shelled egg and to support a portion of the egg yolk component so as to sustain the egg yolk component in a substantially spherical shape, and one or more additional elements configured to partially shield the egg yolk relative to the egg white component from the cooking heat.

Implementations may include one or more of the following features. For example, one or more additional elements comprises a semi-insulation fill disposed as a part of the curved element. The one or more additional elements comprises a semi-permeable radiation shield. The curved element comprises a depression formed in the bottom surface of the body. The one or more additional elements comprises a layer of an insulating material disposed as a part of the curved element. The curved element supports a portion of the egg yolk component so as to sustain the egg yolk component in a substantially spherical shape.

In another general aspect, a method for differentiating the exposure of an egg yolk and an egg white component of a shelled egg to cooking heat during a cooking cycle, the method includes controlling a geometry of the egg white component of the egg, and centering the egg yolk component within a cooking device and supporting a spherical shape of the egg yolk component during the cooking cycle.

Implementations may include one or more of the following features. For example, the method includes providing one or more elements within the cooking device to partially shield the egg yolk component in comparison to the egg white component from the cooking heat. The one or more elements comprises a semi-insulation fill, a semi-insulating layer, or a semi-permeable radiation shield.

DETAILED DESCRIPTION

Figure 1:
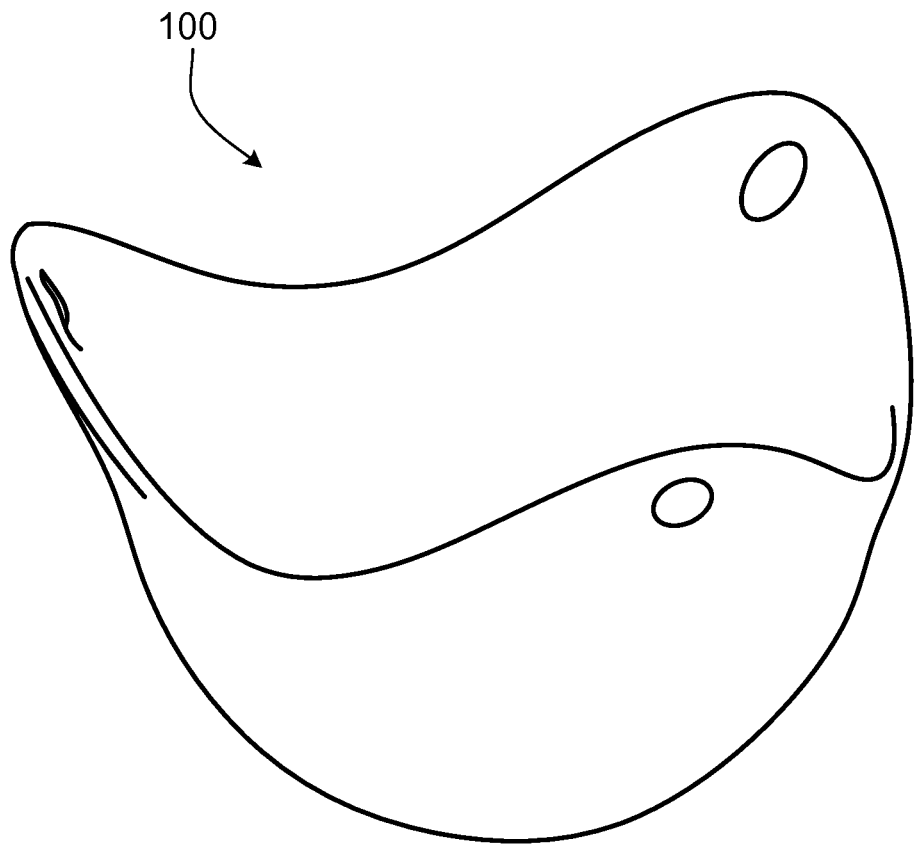
FIG. 1 illustrates an egg cooking apparatus.
Figure 2A:
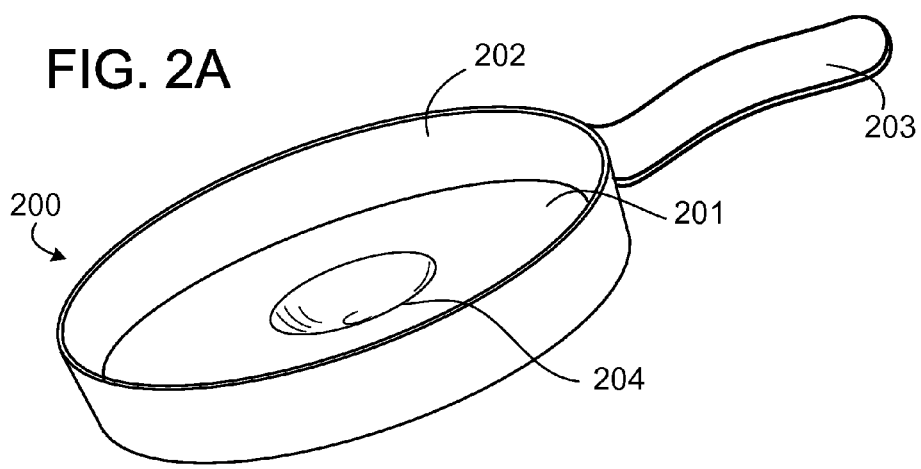
FIG. 2A and FIG. 2B illustrate an implementation of an egg cooking apparatus.
Figure 2B:
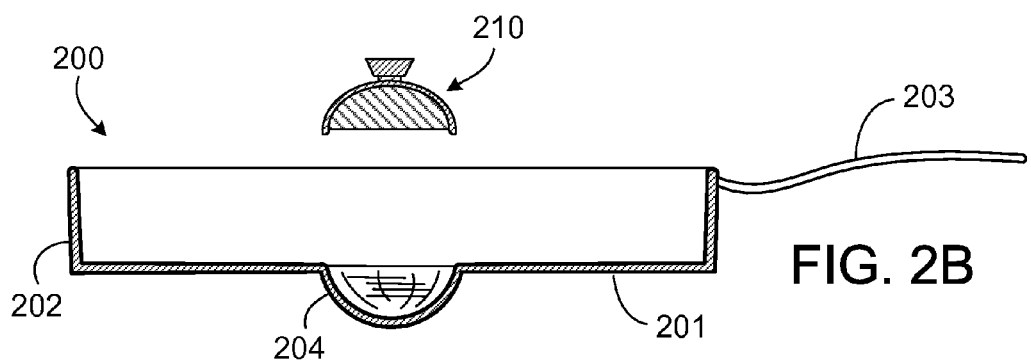

Referring to the accompanying drawings in which like reference numbers indicate like elements, FIG. 2A and FIG. 2B illustrate an implementation of a egg cooking apparatus 200. The egg cooking apparatus 200 includes a container body having a bottom surface 201, a side wall 202 extending upwards from the perimeter of the bottom surface 201, and a handle 203 attached to the side wall 202. The egg cooking apparatus 200 can be made from metals, alloys and other materials that conventional cooking apparatuses are made of, and can be coated with non-stick material. Cooking heat can be applied to the egg cooking apparatus 200 in several ways. In one example, heat is directly applied to the bottom surface 201 of the apparatus 200, and is conducted through the bottom surface 201 and the side wall 202 to an egg that sits in the interior space defined by the bottom and side surfaces 201 and 202. In a different example, the apparatus 200 can be contained within a larger pan with or without a lid containing boiling water, similar to, for example, a conventional egg poacher device. The heat from the steam and water vapor is transmitted to the egg through the bottom, and side surfaces 201 and 202 as well as directly on to the exposed surface of the egg.

The egg cooking apparatus 200 includes a yolk well 204 that is defined and situated on the bottom surface 201 of the egg cooking apparatus 200. The yolk well 204 is formed as a concave recess in the middle of the bottom surface 201, and serves at least the following two purposes: it provides a physical structure to allow the yolk to protrude less above the surface of the thinner layer of albumen to retain the egg yolk in a substantially fixed location relative to the remainder of the apparatus 200; and it provides support to the egg yolk to assist in the retention of its natural substantially spherical shape. The yolk well 204 thereby lengthens the radial distance the heat has to travel to reach the center of the yolk.

The yolk well 204 has a depth which is sufficient to accommodate a substantial portion of the egg yolk. For example, it can be designed to have a depth which is equal to one-third to two-thirds of the diameter of the yolk. When an uncooked egg is introduced into the egg cooking device 200, the yolk will tend to automatically place itself into the yolk well 204 or can be positioned within the yolk well 204 by simply swirling the egg around within the pan. Once in place, the yolk will be securely retained in the well 204 due to the depth of the well 204, thereby changing and controlling the relative geometry of the egg yolk and surrounding albumin. By holding the egg yolk in in the middle of the cooking apparatus 200 the yolk will be substantially surrounded by the albumin, which provides additional shielding from the cooking heat, thereby retarding the cooking process of the yolk.

The contour of the yolk well 204 is shaped such that the yolk is supported to substantially retain its natural spherical shape. For example, the surface of the yolk well 204 can be shaped like a partial sphere so as to provide the yolk substantial dimensional support while resting within the yolk well 204. In comparison to a flattened egg yolk sitting on a flat surface, the spherically supported egg yolk has a greater radial distance from the surface to the core of the yolk. Therefore, the time required to fully cook the spherically supported egg yolk is greater than a flattened egg yolk, allowing a larger margin of time to gauge when the egg is to be removed from heat.

The implementation in FIGS. 2A and 2B shows one yolk well 204 in the middle of the bottom surface 201, but other arrangements can also be implemented. For example, two or more yolk wells can be placed within the egg cooking apparatus 200, allowing two or more eggs to be cooked simultaneously. Further, the location of the yolk well 204 need not be the middle of the bottom surface 201 but can be placed anywhere within the egg cooking apparatus 200, as long as it remains in fluid contact with the interior of the cooking apparatus 200. As an additional measure to insulate the egg yolk from cooking heat, an insulating structure such as, for example, a yolk helmet or lid 210 as shown in FIG. 2B can also be used. The yolk helmet 210 can be made from a semi-insulating material which is less efficient in conducting heat than the material with which the rest of the egg cooking apparatus 200 is made to retard heat transfer and allow the yolk to remain soft and runny while the albumin is cooked to firmness. The helmet 210 may also be transparent to permit the cook to visually monitor cooking of the egg yolk.

Figure 3A:
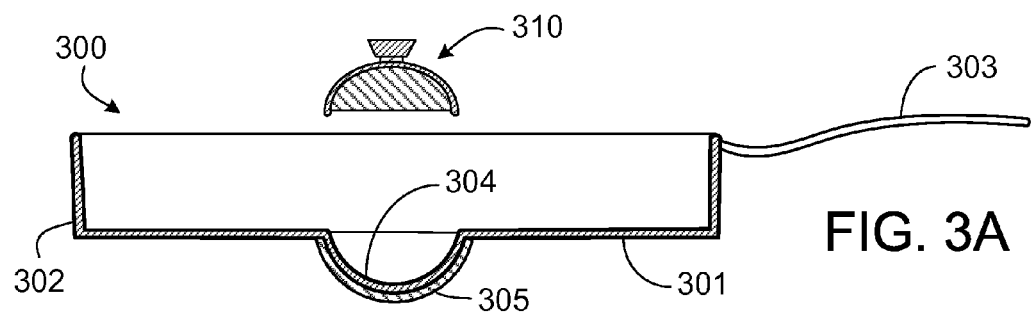
FIG. 3A and FIG. 3B illustrate alternative implementations of an egg cooking apparatus.
Figure 3B:
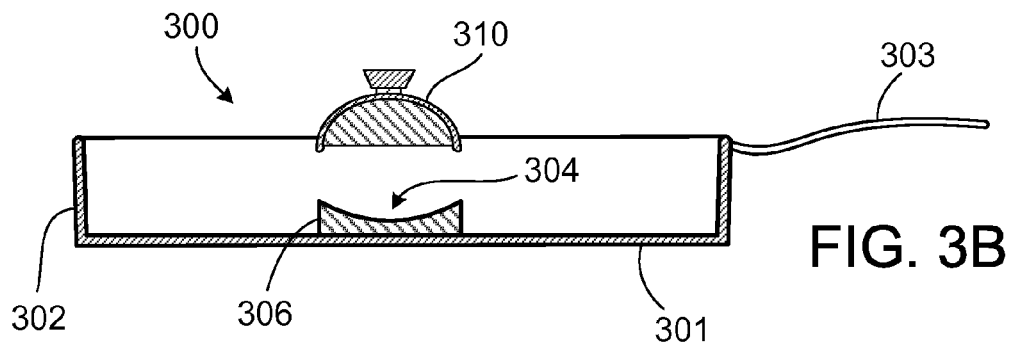

FIGS. 3A and 3B illustrate alternate arrangements of an egg cooking device 300 in which the bottom surface of the yolk well 304 includes an insulating layer 305. The insulating layer 305 is made from a semi-insulating material which is less efficient in conducting heat than the material with which the rest of the egg cooking apparatus 300 is made. Therefore, the amount of heat reaching the egg yolk through the insulating layer 305 is relatively less in comparison to the heat which reaches the albumin through other parts of the cooking apparatus 300, such as the bottom surface 301. The extent of the difference in the amount of heat transferred can be adjusted by various factors such as thickness of the insulating layer 305, thermal conductivity of the semi-insulating material or altering the diameter of the of the pan. The insulating layer 305 can also be placed on the inside of the yolk well 304, in which case the insulating layer 305 may be in direct contact with the egg yolk.

Referring to FIG. 3B, the yolk well 304 can be formed as an elevated platform 306 relative to the bottom surface 301. The elevated platform 306 can be made from a similar material as the insulating layer 305, and that material may form the entire structure of the elevated platform 306. In this implementation, it is possible to provide a much thicker insulating layer 305 which will reduce heat transfer to the yolk, even as compared to, for example, the insulated well 304 of FIG. 3A. As an additional measure to insulate the egg yolk from cooking heat, a yolk helmet or insulating lid 310 as shown in FIG. 3A and FIG. 3B can also be used. The yolk helmet 310 can made from an insulating material similar to that used in the insulating layer 305 to retard heat transfer and allow the yolk to remain soft and runny while the albumin is cooked to firmness. The yolk helmet 310 may also be transparent to permit the cook to visually monitor cooking of the egg yolk.

Figure 4:
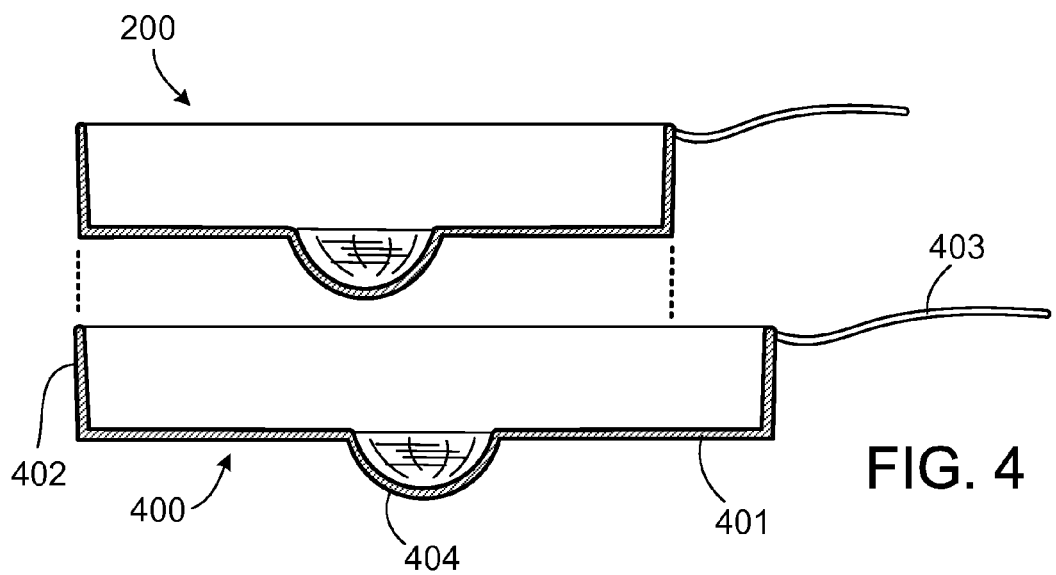
FIG. 4 illustrates another implementation of an egg cooking apparatus.

FIG. 4 shows yet another implementation of an egg cooking device 400, in which a bottom surface 401 of the egg cooking device 400 is expanded beyond the traditional conventional dimensions adopted in the egg cooking apparatus 200 and/or the smaller pans of the traditional egg poacher device being manufactured and marketed today. The egg cooking device 200 of FIGS. 2A and 2B is dimensioned similarly to the smaller pans of the traditional egg poacher devices so as to have the egg yolk submerged in albumin, giving the cooked egg the "poached egg" appearance. Conventional egg poachers by virtue of their dimensions cause the albumin to lie in the poaching cup nearly as thick as or even thicker than the egg yolk, thus requiring a greater amount of heat and longer cooking time for the white to become firm, thereby leading to overcooking the yolk. The dimensionally-expanded bottom surface 401 of the cooking device 400 allows for the thinning out of the albumin to allow greater amount of heat transfer to the albumin and speed up the cooking process of the albumin. In addition, by exposing for view substantially all the albumin in its thinned state, a cook or user can more readily view the egg in order to determine if the albumin is cooked sufficiently or not. Although the thickness of the albumin may be reduced in comparison to the egg poaching device of conventional diameters, it is to be noted that the egg yolk may still be substantially or fully submerged in the albumin since the yolk well 404 is formed as a recess on the bottom surface 401. This makes it possible to cook an egg having the "poached egg" appearance even with a relatively thinner layer of albumin. Conversely, the depth of the yolk well 404 and the diameter of the bottom surface 401 can be manufactured in varying dimensions so as to allow the consumer to now be able to select the exposure of the yolk as desired.

The bottom surfaces 201, 301 and 401 need not be plainly circular as shown in FIGS. 2A, 3A, and 4, but can be molded in various shapes such as a square, a star and so on. Different polygonal shapes of the bottom surface not only contribute to the appearance and aesthetics of the cooked egg, but they also allow natural adjustment of the bottom surface area thereby thinning out the albumin. Shapes that conform to particular food items or dining utensils and dishes can also be used.

Figure 5:
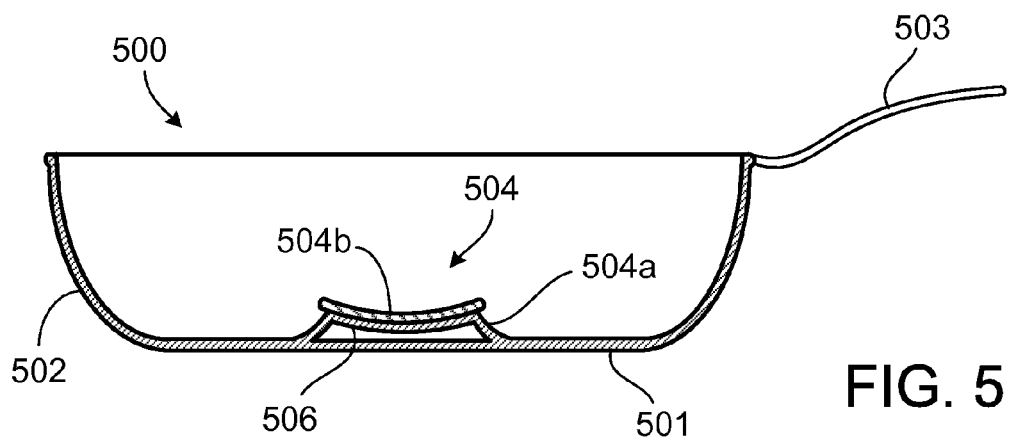
FIG. 5 illustrates another implementation of an egg cooking apparatus.

The egg cooking apparatus can also be implemented as a microwavable egg cooking apparatus as depicted in FIG. 5. The apparatus 500 is made of a microwave-safe material including, for example, plastic, glass, and/or silicone, or combinations thereof. The exemplary implementation shown in FIG. 5 illustrates a yolk well 504 formed as an elevated platform 506 situated substantially in the middle of the bottom surface 501. The yolk well 504 comprises a base 504a and an insulating layer 504b. The insulating layer 504b is made from a thin layer of a semi-permeable insulating material which is microwave-safe and is less transmissive to microwave cooking energy in comparison to the material with which the rest of the egg cooking apparatus 500 is made. Alternatively, the insulating layer 504b may be absent in other implementations of the apparatus 500. When a cracked egg is put in place within the apparatus 500, the yolk sits in the yolk well 504 which is relatively shallower than the yolk well 204 described earlier. The additional support required for the yolk to retain its substantially spherical shape is obtained by submerging the yolk under the albumin, thereby utilizing the same buoyancy that also acts on the yolk in an uncracked egg, giving it a spherical shape. The yolk is also protected from the microwave cooking energy by the surrounding albumin in addition to the insulating layer 504b. When the microwave oven is operated, the microwave cooking energy first passes through either the albumin or the insulating layer 504b prior to reaching the yolk. This reduces the amount of cooking energy received and assists in preventing the egg yolk from being overcooked. Although not shown in FIG. 5, the apparatus 500 may also include, as an additional measure to insulate the egg yolk from cooking heat, a yolk helmet or insulating lid, such as insulating lid 310 as shown in FIG. 3A and FIG. 3B.

A number of implementations and alternatives have been described. Nevertheless, it will be understood that various modifications may be made without departing from the spirit and scope of the disclosure. For example, features of the egg cooking apparatus 200 such as recessed yolk well 204 can also be implemented in the microwavable egg cooking apparatus 500. Likewise, the thin insulating layer 504*b* of the microwavable egg cooking apparatus 500 can be implemented in the egg cooking apparatuses 200, 300 and 400. Further, the shape of the yolk well need not be spherical, but can be any shape or form which would support the egg yolk to hold its natural spherical shape.

Accordingly, other implementations are within the scope of the disclosure.

What is claimed is:

1. An apparatus for cooking eggs, comprising:
   a body having relatively flat bottom surface and one or more surfaces extending from the bottom surface;
   a curved element disposed on the bottom surface of the body and configured to retain an egg yolk component of a shelled egg relative to an egg white component of the shelled egg and to support a portion of the egg yolk component so as to sustain the egg yolk component in a substantially spherical shape; and
   one or more additional elements configured to partially shield the egg yolk to a greater degree than the egg white component from the cooking heat, wherein the one or more additional elements comprises a semi-permeable radiation shield.

2. The apparatus of claim 1, wherein the curved element disposed on the bottom surface of the body is formed as a depression in the bottom surface of the body.

3. The apparatus of claim 1, wherein the body is configured such that the egg yolk component retained in the curved element is substantially submerged in the egg white component.

4. The apparatus of claim 1, wherein the body is configured such that the egg yolk component retained in the curved element is partially shielded from the egg white component.

5. The apparatus of claim 1, wherein the body is formed from a first heat-conducting material.

6. The apparatus of claim 5, wherein the one or more elements is formed from a second heat-conducting material that conducts heat less efficiently than the first heat-conducting material.

* * * * *